United States Patent Office 3,406,146
Patented Oct. 15, 1968

3,406,146
PROCESS FOR STABILIZING SYNTHETIC RUBBER
Kurt Ley and Wolfgang Redetzky, Leverkusen, Robert Seydel, Cologne-Dellbrueck, and Kurt Vohwinkel, Cologne-Stammheim, Germany, assignors to Farbenfabriken Bayer Aktiengesellschaft, Leverkusen, Germany, a corporation of Germany
No Drawing. Filed June 30, 1965, Ser. No. 468,571
Claims priority, application Germany, July 2, 1964,
F 43,329
9 Claims. (Cl. 260—45.95)

ABSTRACT OF THE DISCLOSURE

Synthetic rubber stabilized against cyclization by triarylphosphites wherein one or two of the aryl radicals contain a hydroxyl group.

---

This invention relates to a process for stabilizing synthetic rubber.

It has been found that synthetic rubber can be protected in a particularly advantageous manner against cyclization due to the action of elevated temperatures by means of triarylphosphites in which one or two aryl radicals contain a hydroxyl group.

The present invention therefore provides a process for stabilizing synthetic rubber, which comprises incorporating a triarylphosphite, in which one or two aryl radicals contain a hydroxyl group, in the synthetic rubber as a stabilizer.

phosphites or by reacting hydroxyphenyl dichlorophosphites with phenols.

Polybutadiene- or butadiene-styrene copolymers are examples of synthetic elastomers which may be treated with the stabilizers to avoid cyclization. The stabilizers used according to the invention may be added in quantities of 0.1 to 5 parts by weight, preferably 0.5 to 1.5 parts by weight, based on 100 parts by weight of elastomer, and they may be added by the usual method on rollers or in internal mixers during hot mixing or before tempering. The stabilizers used according to the invention may also be added at an earlier stage, namely to the synthetic rubber latex (before it is worked up to the solid product), if desired together with other stabilizers.

When the stabilizers used according to the invention are added, the conditions for heat treatment of the synthetic rubber, e.g. hot rolling, hot mixing, tempering etc., may be more stringent without cyclization of the rubber taking place. Better mechanical properties, e.g. higher tensile strength, higher elongation at break and less abrasion are thereby achieved in the vulcanizates. Other advantages are that when the process according to the invention is employed, the synthetic rubbers or batches of filler-rubber mixtures can be more easily worked up (i.e. they are of better plasticity) and the synthetic rubbers, batches and vulcanizates protected in this way have better resistance to discolouration than those prepared with the compounds hitherto known.

The following examples illustrate the invention:

TABLE 2

| Defo Hardness/ Defo Elasticity | Without anticyclisation agent (for comparison) | 2,2'-methylene-bis-(6-tertiary-butyl-4-methyl-phenol) (for comparison) | Compound No. 1 from Table 1 | Compound No. 2 from Table 1 | Compound No. 3 from Table 1 | Compound No. 4 from Table 1 | Compound No. 5 from Table 1 | Compound No. 6 from Table 1 |
|---|---|---|---|---|---|---|---|---|
| 10 minutes | 1,375/52 | 750/40 | 625/36 | 659/41 | 550/35 | 625/32 | 600/33 | 659/38 |
| 15 minutes | 1,550/50 | 750/42 | 575/34 | 575/37 | 525/33 | 575/32 | 450/33 | 600/38 |
| 20 minutes | 1,900/56 | 675/44 | 500/32 | 550/39 | 500/32 | 500/34 | 500/33 | 650/40 |
| 30 minutes | 2,200/60 | 600/40 | 450/31 | 475/39 | 375/25 | 425/30 | 475/33 | 575/39 |
| Colour of polymer after 30 minutes hot rolling. | Brown | Black brown | Pale brown | Pale brown | Pale brown | Pale brown | Pale brown | Pale brown |

Examples of stabilizers which can be used are given in Table 1.

TABLE 1

| Compound No. | Chemical name |
|---|---|
| (1) | [Bis-(3,5-di-tertiary-butyl-4-hydroxyphenyl)-1-(phenyl)]-phosphite. |
| (2) | [Bis-(3,5-di-tertiary-butyl-4-hydroxyphenyl)-1-(4'-methylphenyl)]-phosphite. |
| (3) | [Bis-(3,5-di-tertiary-butyl-4-hydroxyphenyl)-1-(4'-tertiary-butylphenyl)]-phosphite. |
| (4) | [Bis-(3,5-di-tertiary-butyl-4-hydroxyphenyl)-1-(3',5'-dimethylphenyl)]-phosphite. |
| (5) | [Bis-(3,5-di-tertiary-butyl-4-hydroxyphenyl)-1-(4'-iso-dodecylphenyl)]-phosphite. |
| (6) | [(3,5-di-tertiary-butyl-4-hydroxyphenyl)-bis-(4'-tertiary-butylphenyl)]-phosphite. |

The aryl groups preferably contain the hydroxyl group in the p-position. Further, these aryl radicals are preferably substituted by alkyl radicals in both o-positions to the hydroxyl group, the carbon atom adjacent to the aryl radical being a tertiary carbon atom. These alkyl radicals preferably contain 4 to 7 carbon atoms. The aryl radicals of the triaryl-phosphites may be further substituted by one or more hydrocarbon radicals and these radicals may contain e.g. up to 12 carbon atoms. The compounds used according to the invention can be obtained by reacting the appropriate hydroquinones with appropriate aryl dichloro-

Example 1

The following mixture was rolled on a laboratory rolling mill at a rolling temperature of 170° C.:

Parts by weight
Styrene-butadiene copolymer _____ 100
Anticyclization agent
 (i.e. stabilizer) see Table 2 _____ 1

A sample was removed at the end of the time indicated in each case and the Defo hardness and Defo elasticity determined according to DIN 53 514. The values obtained in these tests are summarized in Table 2. The number before the stroke indicates the Defo hardness, that after the stroke the Defo elasticity. (DIN refers to the German Industrial Norm.)

Compound No. 3 in Table 1 was obtained as follows: 111 g. (0.5 mol) of 2,6-di-tertiary-butyl-hydroquinone were dissolved in 300 ml. of toluene. 62 g. (0.25 mol) 4 - tertiary - butylphenyl - dichlorophosphite were added dropwise to this solution at 70° C. with stirring. Evolution of hydrogen chloride set in. The temperature was increased to 100° C. and finally to 110° C. and kept at that temperature until evolution of hydrogen chloride ceased. The toluene was withdrawn and 145 g. of a yellow viscous oil remained behind.

Calculated for $C_{38}H_{50}O_5P_1$: C, 74.0%; H, 8.1%; P, 5.03%. Found: C, 73.5%; H, 8.7%; P, 4.90%.

ing no discolouration and 4 indicating a strong discolouration.

TABLE 3

| ML-4/Δ-Mooney value at 140° C. hot air after | Without addition (for comparison) | 0.5 part by weight/100 parts by weight of rubber 2,2'-methylene-bis-(6-tertiary-butyl-4-methyl-phenol) (for comparison) | 0.5 part by weight/100 parts by weight of rubber Compound No. 3 from Table 1 | 0.5 part by weight/100 parts by weight of rubber Compound No. 6 from Table 1 | 1.0 part by weight/100 parts by weight of rubber 2,2'-methylene-bis-(6-tertiary-butyl-4-methyl-phenol) (for comparison) | 1.0 part by weight/100 parts by weight of rubber Compound No. 3 from Table 1 | 1.0 part by weight/100 parts by weight of rubber Compound No. 6 from Table 1 |
|---|---|---|---|---|---|---|---|
| 0 hours | 65/0 | 35/+5 | 36/+4 | 36/+5 | 39/+4 | 39/+5 | 39/+5 |
| 2 hours | | 25/+4 | 24/+4 | 27/+3 | 29/+4 | 31/+4 | 31/+4 |
| 3 hours | | 22/+5 | 19/+5 | 19/+4 | 24/+4 | 24/+4 | 26/+3 |
| 4 hours | | 23/+5 | 21/+4 | 12/+3 | 24/+4 | 23/+4 | 27/+3 |
| 6 hours | | 22/+5 | 20/+5 | 16/+3 | 23/+5 | 19/+4 | 24/+4 |
| Discoloration after 4 hours' storage at 140° C. hot air | 0 | 3 | 0 | 0 | 4 | 0 | 0 |

Compound No. 6 in Table 1 was prepared as follows: 222 g. (1 mol) 2,6-di-tertiary-butyl-hydroquinone were added portionwise to 900 g. of phosphorus trichloride and 1 g. of magnesium chloride. When evolution of hydrogen chloride had ceased, the reaction mixture was boiled for 4 hours and the excess of phosphorus trichloride distilled off. The oil remaining behind was diluted with 300 ml. of toluene. To this there were added 300 g. (2 mols) p-tertiary-butylphenol and the mixture was heated until evolution of hydrogen chloride ceased. The magnesium chloride was filtered off and the toluene distilled off. 530 g. of a colourless oil remained behind.

Calculated for $C_{34}H_{47}O_5P_1$: C, 72.4%; H, 8.3%; P, 5.48%. Found: C, 73.1%; H, 8.5%; P, 5.30%.

Example 2

In the following text, polybutadienes are understood to mean polymers which have been prepared by known methods by polymerization of butadiene using organo-metallic compounds of the alkali metals or using organo-metallic mixed catalysts in organic solvents. Homopolymers of butadiene for which the particulars given below are applicable can also be prepared with radical catalysts in emulsion.

32 liters of butadiene in 230 liters of toluene were polymerized under the usual conditions for polymerization with organometallic mixed catalysts, using a catalyst mixture of 74.5 g. of aluminum triisobutyl, 29.1 g. of titanium butoxytriiodide and 11.0 g. of titanium tetrachloride at temperatures between 0 and 20° C. After 2.2 hours, the yield was 96%.

The polymer solution was pumped into a vessel equipped with a stirrer, which vessel contained 0.2 kg. of disproportionated resinic acid and the quantities indicated below of the various stabilizers dissolved in 5 liters of toluene. The solvent was then removed by steam distillation and the rubber lumps obtained dried in an expander screw. 20 kg. of polybutadiene having a Mooney viscosity of ML-4=48 were obtained.

The stability was tested by storing the product for varying lengths of time in hot air at 140° C. and then measuring the Mooney viscosity ML-4 according to DIN 53 523. A satisfactorily stabilized polybutadiene shows a slight drop in the Mooney viscosity; the shape of the Mooney curve obtained by the difference in the Mooney viscosity (Δ-Mooney value after 1 minute and 4 minutes) is also good measure of the stability. The Δ-Mooney value should have a positive sign and be as high as possible. The results obtained with different doses of stabilizers are indicated in Table 3. The resulting discolouration is indicated by the number 0 to 4, 0 indicating no discolouration and 4 indicating a strong discolouration.

We claim:

1. A composition of matter comprising synthetic diene rubber stabilized against cyclization by from 0.1 to 1.5 parts by weight, based on 100 parts by weight of synthetic rubber of a triaryl phosphite of the formula

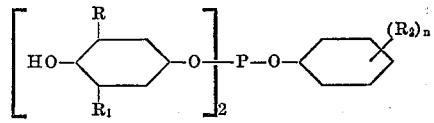

wherein R and $R_1$ stand for an alkyl radical having 4 to 7 carbon atoms, the carbon atom adjacent to the phenyl radical being a tertiary carbon atom, $R_2$ stands for an alkyl radical having up to 12 carbon atoms and $n$ stands for 1 or 2.

2. The composition according to claim 1 wherein the triarylphosphite is [Bis-(3,5-di-tertiary-butyl-4-hydroxyphenyl)-1-(phenyl)]-phosphite.

3. The composition according to claim 1 wherein the triarylphosphite is [Bis-(3,5-di-tertiary-butyl-4-hydroxyphenyl)-1-(4'-methylphenyl)]-phosphite.

4. The composition according to claim 1 wherein the triarylphosphite is [Bis-(3,5-di-tertiary-butyl-4-hydroxyphenyl)-1-(4'-tertiary-butylphenyl)]-phosphite.

5. The composition according to claim 1 wherein the triarylphosphite is [Bis-(3,5-di-tertiary-butyl-4-hydroxyphenyl)-1-(3',5'-dimethylphenyl)]-phosphite.

6. The composition according to claim 1 wherein the triarylphosphite is [Bis-(3,5-di-tertiary-butyl-4-hydroxyphenyl)-1-(4'-iso-dodecylphenyl)]-phosphite.

7. The composition according to claim 1 wherein the triarylphosphite is [(3,5 - di - tertiary - butyl - 4 - hydroxyphenyl)-bis-(4'-tertiary-butylphenyl)]-phosphite.

8. The composition according to claim 1 wherein the diene rubber is a styrene-butadiene polymer.

9. The composition according to claim 2 wherein the diene rubber is a styrene-butadiene polymer.

References Cited

UNITED STATES PATENTS

| 3,039,993 | 6/1962 | Friedman | 260—45.7 |
| 3,080,338 | 5/1963 | Nudenberg et al. | 260—45.7 |
| 3,112,286 | 11/1963 | Morris et al. | 260—45.95 |
| 3,244,661 | 4/1966 | Kline | 260—45.7 |
| 3,061,583 | 10/1962 | Huhn et al. | 260—45.7 |

DONALD E. CZAJA, *Primary Examiner.*

H. A. LAYLER, *Assistant Examiner.*